United States Patent
Awad

(10) Patent No.: US 7,602,870 B2
(45) Date of Patent: Oct. 13, 2009

(54) SYMBOL TIMING ESTIMATION IN COMMUNICATION SYSTEMS

(75) Inventor: Yassin Aden Awad, Middlesex (GB)

(73) Assignee: Fujitsu Limited, Kawasaki (JP)

( * ) Notice: Subject to any disclaimer, the term of this patent is extended or adjusted under 35 U.S.C. 154(b) by 562 days.

(21) Appl. No.: 11/280,452

(22) Filed: Nov. 17, 2005

(65) Prior Publication Data
US 2006/0133525 A1  Jun. 22, 2006

(30) Foreign Application Priority Data
Dec. 16, 2004  (GB) ................................ 0427623.4

(51) Int. Cl.
H04K 1/10 (2006.01)
H04L 7/00 (2006.01)

(52) U.S. Cl. .................. 375/355; 375/260; 375/324

(58) Field of Classification Search ............. 375/324, 375/260, 354, 355, 343; 370/503, 504, 528
See application file for complete search history.

(56) References Cited

U.S. PATENT DOCUMENTS

| 4,819,197 | A* | 4/1989 | Blais | 708/207 |
| 6,674,817 | B1* | 1/2004 | Dolle et al. | 375/342 |
| 7,020,116 | B1* | 3/2006 | Nakada | 370/338 |
| 7,418,040 | B2* | 8/2008 | Rudowicz et al. | 375/260 |
| 2002/0146063 | A1* | 10/2002 | Gorokhov et al. | 375/148 |
| 2003/0072356 | A1* | 4/2003 | Abraham et al. | 375/148 |
| 2004/0170197 | A1* | 9/2004 | Mehta | 370/504 |
| 2006/0050801 | A1* | 3/2006 | Beach et al. | 375/260 |
| 2006/0146962 | A1* | 7/2006 | Troya et al. | 375/340 |
| 2007/0019538 | A1* | 1/2007 | Long et al. | 370/208 |

FOREIGN PATENT DOCUMENTS
WO  WO 2004/008706 A2  1/2004

OTHER PUBLICATIONS

J.Echavarri, M.E. Woodward and S.K. Barton, "A Comparison of Time and Frequency Synchronisation Algorithms for the European DVB-T System", University of Bradford and University of Leeds, United Kingdom, 1999 IEEE.*
Allert Van Zelst and Tim C.W. Schenk, "Implementation of a MIMO OFDM-Based Wireless LAN System", IEEE Transactions on Signal Processing, vol. 52, No. 2, Feb. 2004.*

(Continued)

Primary Examiner—Chieh M Fan
Assistant Examiner—Aristocratis Fotakis
(74) Attorney, Agent, or Firm—Hanify & King, P.C.

(57) ABSTRACT

A symbol timing estimation method is provided for use in a communication system, for example an orthogonal frequency division multiplexing system having a cyclic prefix extension CPE. Each symbol in a transmitted signal comprises N symbol samples, and the CPE has L symbol samples. The method comprises receiving the signal and processing the symbol samples in the received signal using N and L to obtain a correlation function γ(d) for a first series of L samples and a second series of L samples following N samples after the first series. The obtained correlation function is normalized to produce a basic measure $M_{CP}(d)$ for symbol timing estimation. A second-derivative measure $M_{CP\_diff2}(d)$ for symbol timing estimation is also produced based on a second derivative of the basic measure, and the symbol timing is estimated based on the basic and second-derivative measures.

Such a symbol timing estimation method can work over a wide range of channel conditions and can detect the first significant path reliably in a multi-path environment, even if there are delayed paths of higher energy.

21 Claims, 11 Drawing Sheets

OTHER PUBLICATIONS

A.M. Gallardo and J. Rodriguez-Tellez, "Comparison of Joint Coarse Timing and Fine Carrier Frequency Estimation Algorithms for DVB-T OFDM based Single Frequency Networks", Dept. of Electronics and Telecommunications, University of Bradford, UK.*

* cited by examiner

SYMBOL TIMING ESTIMATION IN COMMUNICATION SYSTEMS

BACKGROUND OF THE INVENTION

1. Field of the Invention

The present invention relates to symbol timing estimation in communication systems, for example orthogonal frequency division multiplexing systems.

2. Description of the Related Art

Orthogonal frequency division multiplexing (OFDM) has been proposed for use in high bit-rate wireless applications in multi-path radio environments. OFDM can enable such applications without a high complexity receiver. OFDM is required by wireless local area network (WLAN), digital video broadcasting (DVB) and broadband wireless access (BWA) standards and is a strong candidate for some of the 4G wireless technologies.

OFDM is a multicarrier block transmission system. A block of N symbols are grouped together and sent in parallel. There is no interference among the data symbols sent in a block. In the transmitter, samples of the multicarrier signal can be obtained using an inverse fast fourier transform (IFFT) of the data symbols. A fast fourier transform (FFT) can be used in the receiver to obtain the data symbols. There is no need for N oscillators, filters and so on.

The popularity of OFDM stems from the use of IFFT/FFT in the transmitter and receiver respectively, these having efficient implementations.

FIG. 1(A) shows an example of a signal transmitted from the transmitter in an OFDM system. The transmitted signal comprises a succession of time domain symbols OS1, OS2 and OS3. In a multipath environment, the transmitted signal reflects off several objects before reaching the receiver, with the result that multiple delayed versions of the same signal arrive at the receiver. This delay spread causes distortion of the transmitted signal known as intersymbol interference (ISI), as shown in FIG. 1(B).

To try to prevent this intersymbol interference, it has been proposed to insert a guard interval between successive ones of the symbols in the transmitted signal. Although zeros could be inserted into the guard interval to alleviate the ISI problem, orthogonality of the carriers is lost when multipath channels are involved. Accordingly, to restore the orthogonality it has been proposed to include a cyclic prefix (CP) or cyclic prefix extension (CPE), in the guard interval, as shown in FIG. 2.

As shown in FIG. 2, an original OFDM symbol OS comprises N symbol samples and has a useful symbol period Tu. The last L symbol samples of the symbol are copied into the guard interval at the beginning of the symbol. In this way, for each symbol the same series of L symbol samples appears originally in the guard interval and then again, N symbol samples after its original appearance, at the end of the symbol. For example, Tu may be 13.05 µs, N may be 1024 and L may be 200, so that the guard interval duration is 2.55 µs.

The effect of the insertion of the cyclic prefix extension in a multipath environment is illustrated in FIG. 3. As shown in FIG. 3, a signal having two consecutive symbols OS1 and OS2, each with a CPE, is transmitted by the transmitter. FIG. 3 shows that four different versions of the transmitted signal arrive at the receiver with different delays. Provided that the CPE is longer than the maximum channel delay profile, it can be effective to prevent intersymbol interference. The effect of the CPE is to convert a linear convolution channel into a circular convolution channel, which restores the orthogonality at the receiver. However, energy is wasted in the cyclic prefix samples.

FIG. 4 shows an example of an OFDM system employing the cyclic prefix extension to reduce intersymbol interference. The system comprises a transmitter 1, a receiver 2, and a multi-path radio channel 3 which links the transmitter 1 to the receiver 2.

In the transmitter 1 data to be transmitted 10 is subjected to coding in a coding block 12, for example Turbo coding with a coding rate of ½ or ¾, and the coded transmission data is then subjected to a predetermined modulation, for example quadrature phase shift keying QPSK in a modulator 14 to obtain a series of data symbols DS. Also, a pilot symbol insertion block 16 produces, from time to time, pilot symbols PS to be sent with the data symbols DS to the receiver. A multiplexer 18 receives the data symbols DS and the pilot symbols PS and combines them into a single stream of symbols used to modulate the spectrum. This single stream of symbols is subject to serial-to-parallel conversion in a serial-to-parallel converter block 20, and the resulting block of parallel data is subject to an inverse fast fourier transform process in an IFFT block 22. The output of the IFFT block 22 comprises a series of time domain symbols TDS.

Next, each time domain symbol TDS has a cyclic prefix extension inserted at the beginning of the symbol by a CPE insertion block 24. The time domain symbols having respective CPEs are then converted into an analog signal by a digital-to-analog converter (DAC) 26 and are then up-converted into radio frequency (RF) signals by an RF block 27. The RF signal is transmitted to the receiver via the channel 3.

In the receiver 2, the RF signal received from the transmitter is down-converted into a baseband signal by an RF section 28. The baseband analog signal is converted into a corresponding digital signal by an analog-to-digital converter (ADC) 30. This digital signal comprises successive time domain symbols TDS. These time domain symbols TDS are supplied to a CPE removing block 34 and a symbol timing and frequency synchronisation block 36. The symbol timing and frequency synchronisation block 36 determines a symbol timing point STP for each time domain symbol TDS and supplies this symbol timing point STP to the CPE removing block 34. The CPE removing block 34 then removes from each TDS its CPE. The series of time domain symbols TDS with the CPEs removed is then applied to a FFT block 38 which applies FFT processing to the symbols to derive therefrom the original data symbols DS and pilot symbols PS.

These data symbols and pilot symbols are subject to parallel-to-serial conversion in a parallel-to-serial converter 40. The data symbols DS are then separated from the pilot symbols PS by a demultiplexer 42. The pilot symbols PS are supplied to a channel estimation block 44 which performs channel estimation based on the pilot symbols. A channel estimate CE obtained by the channel estimation block 44 is supplied to a demodulator 46 which also receives the data symbols DS. The demodulator 46 demodulates the data symbols DS and then supplies the demodulated symbols to a decoding block 48 which decodes the demodulator symbols to produce reconstructed data 50 which is output from the receiver.

FIG. 5 shows a conventional implementation of the symbol timing and frequency synchronisation block 36 in the receiver 2 of FIG. 4. In this implementation, successive symbol samples $r_k$ of the received time domain symbols TDS are applied to an input I. The samples $r_k$ are applied to a first input of a complex multiplier 362. The samples $r_k$ are also applied to an input of a delay block 364 which delays the samples by N samples to produce a stream of delayed samples $r_{k+N}$. Here, as described previously, N is the number of samples per OFDM symbol prior to CPE insretion. The delayed samples $r_{k+N}$ are subject to conjugation by a conjugation block 366 to produce conjugated samples $r^*_{k+N}$ which are applied to a further input of the complex multiplier 362. The output $r_k r^*_{k+N}$ of the multiplier 362 is applied to an input of a moving summation block 368 which produces a moving sum of L samples of the output of the multiplier 362. Here, as described previously, L is the number of samples in the CPE. This moving sum γ(d) is a correlation function representing the autocorrelation of a first series of L samples, starting with sample d and ending with sample d+L−1, and a second series of L samples starting with sample d+N and ending with sample d+N+L−1. Here, d is a sample index. In other words $$\gamma(d) = \sum_{k=d}^{d+L-1} r_k r^*_{k+N}.$$

This correlation function γ(d) will have a peak value when the first series of L samples coincides with the CPE and the second series of samples coincides with the last L samples of the symbol. In this way, the peak value of the correlation function γ(d) can be used to detect the symbol timing.

In order to identify the peak reliably, the correlation function γ(d) is subjected to normalisation to obtain a normalised measure $M_{CP}(d)$ for symbol timing estimation. To carry out this normalisation, an energy R(d) of the cyclic prefix portion is calculated according to the formula $$R(d) = \frac{1}{2} \sum_{k=d}^{d+L-1} (|r_k|^2 + |r_{k+N}|^2).$$

In FIG. 5, an energy $|r_k|^2$ of each sample $r_k$ is calculated by a first squarer 370, and an energy $|r_{k+N}|^2$ of each delayed sample $r_{k+N}$ is calculated by a second squarer 372. The outputs of the first and second squarers 370 and 372 are summed by an adder 374, and the sum $|r_k|^2 + |r_{k+N}|^2$ of the sample energies is then subjected to a moving summation by a moving summation block 376. As in the case of the moving summation block 368, the moving sum comprises L successive $r_k$ samples and L successive delayed samples $r_{k+N}$. The moving sum produced by the moving summation block 376 is then halved by a multiplier 378 to produce the energy R(d). This energy R(d) is then squared by a squarer 380 and the result $R^2(d)$ is applied to one input of a divider 382.

The correlation function γ(d) is also subjected to squaring by a further squarer 384 and the result $|\gamma(d)|^2$ is applied to the other input of the divider 382. Thus, the divider 382 produces at its output the normalised measure $M_{CP}(d)$ for symbol timing estimation, where $$M_{CP}(d) = \frac{|\gamma(d)|^2}{R^2(d)}.$$

A symbol timing estimate (STP in FIG. 4) is taken to be the point in time when $M_{CP}(d)$ has a peak value in the symbol period.

A trigger circuit 386 is also triggered upon detecting the peak value in the normalised measure $M_{CP}(d)$. At this time, the correlation function γ(d) is applied to a phase detector 388 which detects a phase angle of the correlation function. This phase angle is divided by −2π by a multiplier 390 to produce a measure $$\Delta \hat{f}_{CP}$$

for frequency offset estimation, where $$\Delta \hat{f}_{CP} = -\frac{1}{2\pi} L\gamma(d).$$

The accuracy of the symbol timing estimate and the frequency offset measure can have a significant effect on performance of the OFDM system. For example, the frequency offset can influence orthogonality of subcarriers, and loss of orthoganality in turn leads to intercarrier interference.

In the FIG. 5 implementation the measure $M_{CP}(d)$ provides a good timing estimate when the power of the first path in a multipath environment is the largest. However, when delayed paths have more power than the first significant path, the measure does not provide a good estimate for symbol timing. In such cases, the measure $M_{CP}(d)$ will have a peak for the strongest delayed path and will set this as the symbol timing point.

FIGS. 6(A) to 6(D) illustrate schematically the variation of the measure $M_{CP}(d)$ with the sample index over a symbol period. FIGS. 6(A) and 6(B) both illustrate the variation under line-of-sight (LO) conditions. In FIG. 6(A) it is assumed that there is a single dominant path. In this case, the measure $M_{CP}(d)$ has a single peak from which the symbol timing can be taken. In the case of FIG. 6(B) there are two paths, the first path having a higher energy than the second (delayed) path. In this case the measure $M_{CP}(d)$ corresponds to the superposition of both paths. However, since the first path is stronger than the second path, the peak in the measure $M_{CP}(d)$ still constitutes the correct symbol timing point.

FIGS. 6(C) and 6(D) illustrate the variation of $M_{CP}(d)$ under non-line-of-sight (NLO) conditions. In FIG. 6(C) a first path has less energy than a second (delayed) path but the first path is still significant. The measure $M_{CP}(d)$ is represented by the superposition of both paths, as in FIG. 6(B). In this case, however, the peak in $M_{CP}(d)$ corresponds to the timing of the second path, which provides the wrong symbol timing. A similar situation applies in FIG. 6(D). In this case, the first and second (delayed) paths have the same energy and this causes the measure $M_{CP}(d)$ to have a plateau region. It is difficult to determine the symbol timing point reliably from this plateau region, because there will usually be significant noise in the measure so that the plateau region will not be completely flat.

It is therefore desirable to provide an improved method and apparatus for obtaining a symbol timing estimate which can work over a wider range of channel conditions. In particular, it is desirable to detect the first significant path reliably in a multipath environment, even if there are delayed paths of higher energy.

SUMMARY OF THE INVENTION

According to a first aspect of the present invention there is provided a symbol timing estimation method. The method is suitable for use in a communication system in which symbols are successively transmitted in a signal, each symbol comprising a predetermined number of symbol samples, and in which a series of L symbol samples is repeated N symbol samples after its original appearance, where L and N are integers. The method comprises receiving the signal and processing the symbol samples in the received signal using N and L to obtain a correlation function for the originally-appearing series and the repeated series. A basic measure for symbol timing estimation is produced based on the obtained correlation function, and a second-derivative measure for symbol timing estimation is produced based on a second derivative of the basic measure. The symbol timing is estimated based on the basic and second-derivative measures.

According to a second aspect of the present invention there is provided symbol timing estimation apparatus for use in such a communication system. A correlation unit receives the signal and processes the symbol samples in the received signal using N and L to obtain a correlation function for the originally-appearing series and the repeated series. A basic measure producing unit produces a basic measure for symbol timing estimation based on the obtained correlation function. A second-derivative measure producing unit produces a second-derivative measure for symbol timing estimation based on a second derivative of said basic measure. A symbol timing estimating unit estimates the symbol timing based on said basic and second-derivative measures.

According to a third aspect of the present invention there is provided a receiver, for use in a communication system, comprising apparatus embodying the aforesaid second aspect of the present invention.

According to a fourth aspect of the present invention there is provided a user equipment, for use in a cellular communications system, the user equipment comprising apparatus embodying the aforesaid second aspect of the present invention.

In practice a symbol timing estimation method embodying the invention is likely to be implemented at least in part by a processor in the receiver which runs an operating program. Thus, according to a fifth aspect of the present invention there is provided an operating program which, when run on a processor in a receiver of a communication system in which symbols are successively transmitted in a signal, each symbol comprising a predetermined number of symbol samples, and in which a series of L symbol samples is repeated N symbol samples after its original appearance, where L and N are integers, causes the receiver to carry out the steps of: receiving the signal and processing the symbol samples in the received signal using N and L to obtain a correlation function for the originally-appearing series and the repeated series; producing a basic measure for symbol timing estimation based on the obtained correlation function; producing a second-derivative measure for symbol timing estimation based on a second derivative of the basic measure; and estimating the symbol timing based on the basic and second measures.

Such an operating program embodying the invention may be provided by itself or may be carried by a carrier medium. The carrier medium may be a recording medium such as a disk or CDROM. Alternatively, the carrier medium may be a transmission medium such as a signal.

Further aspects of the present invention can provide control circuitry for use in a receiver and adapted to carry out the symbol timing estimation method of the first aspect.

DETAILED DESCRIPTION OF THE PREFERRED EMBODIMENTS

Figure 7:
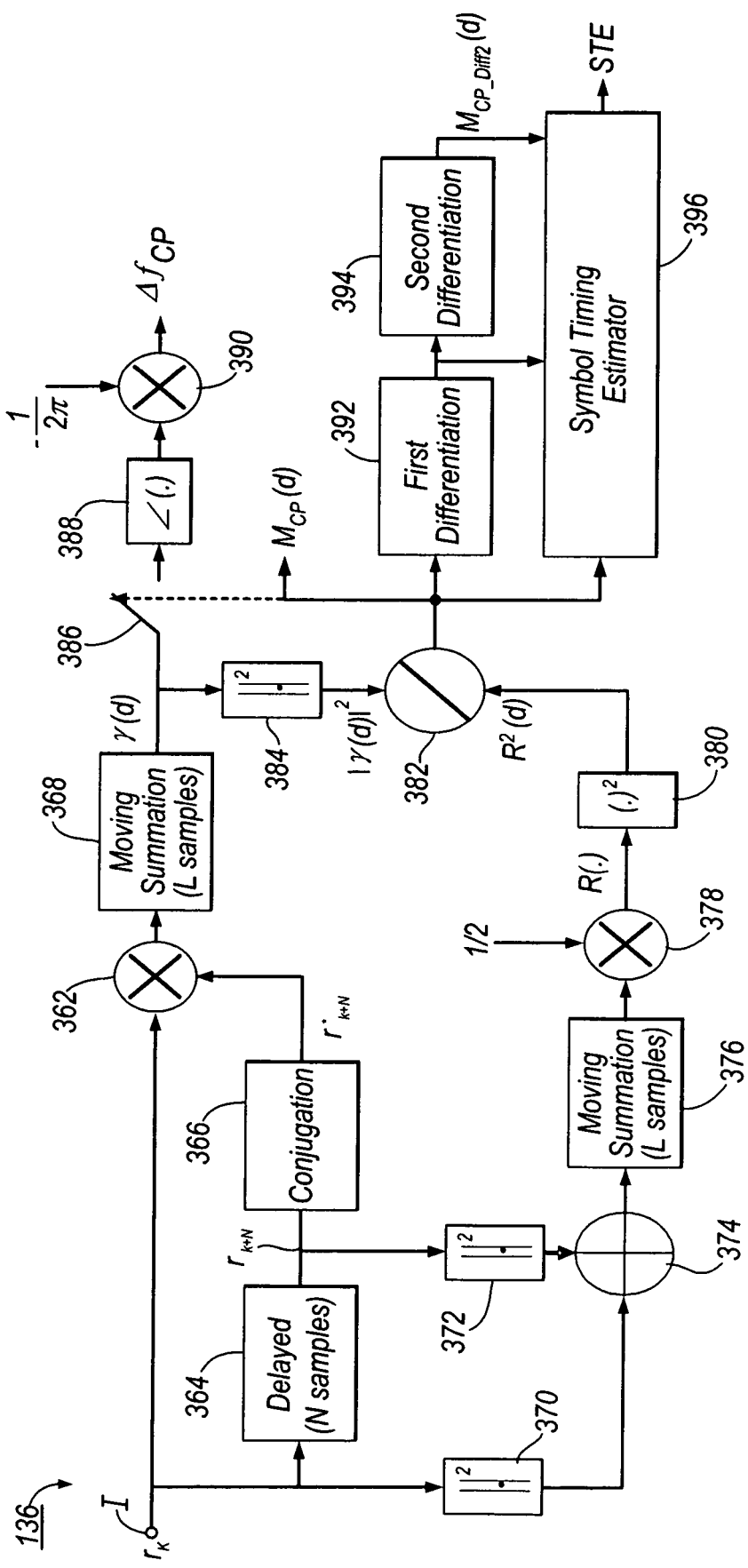
FIG. 7 shows a block diagram of symbol timing estimation apparatus according to a preferred embodiment of the present invention.

FIG. 7 shows symbol timing estimation apparatus 136 according to a preferred embodiment of the present invention. In FIG. 7, parts which are the same as parts shown in the conventional apparatus of FIG. 5 are denoted by the same reference numerals and will not be described further.

Figure 1A:
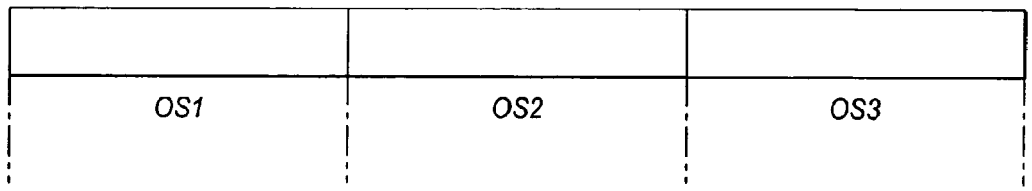
FIGS. 1(A) and 1(B), discussed hereinbefore, are timing diagrams for use in explaining interference between OFDM symbols.
Figure 1B:
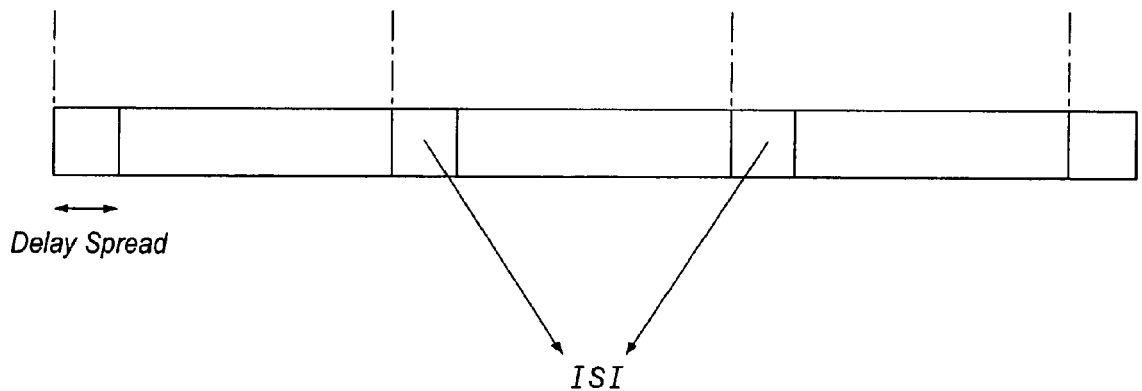
Figure 2:
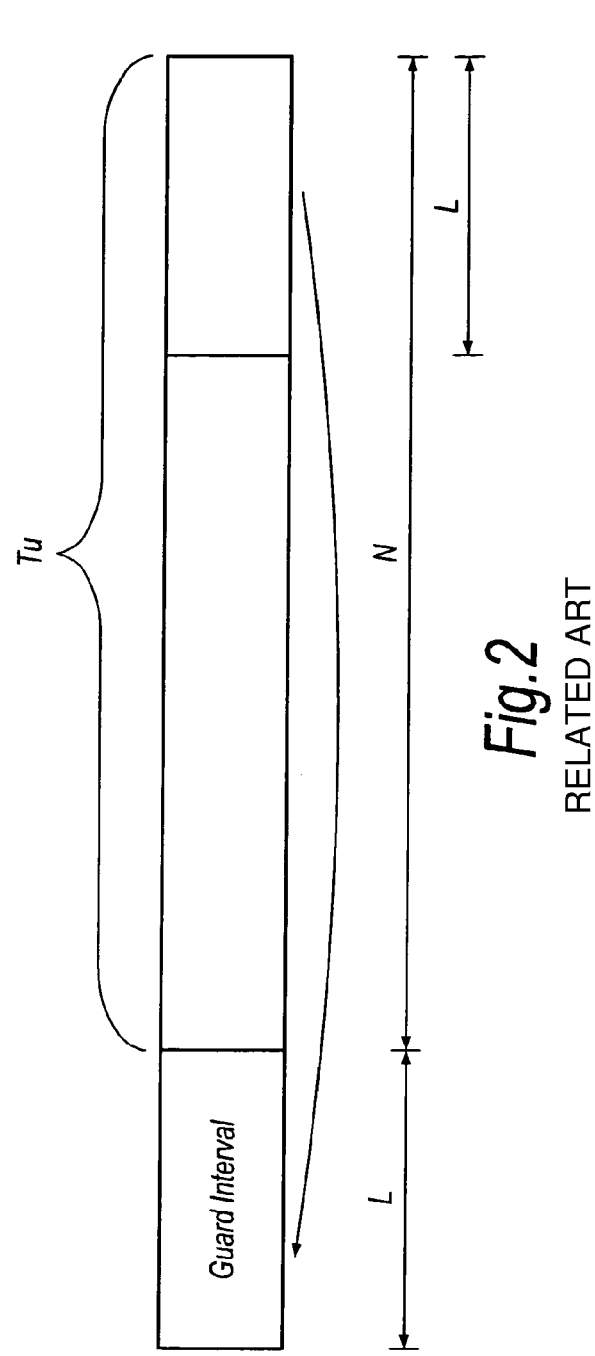
FIG. 2, discussed hereinbefore, is a schematic view for explaining a cyclic prefix extension which can be added to the beginning of a OFDM symbol.
Figure 3:
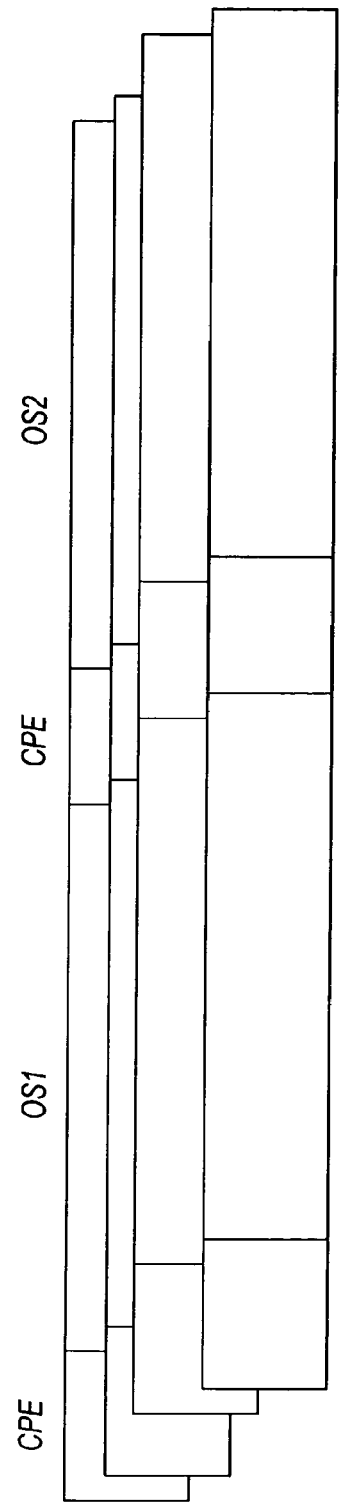
FIG. 3, discussed hereinbefore, is a schematic view showing delayed versions of a transmitted signal reaching a receiver in a multi-path environment.
Figure 4:
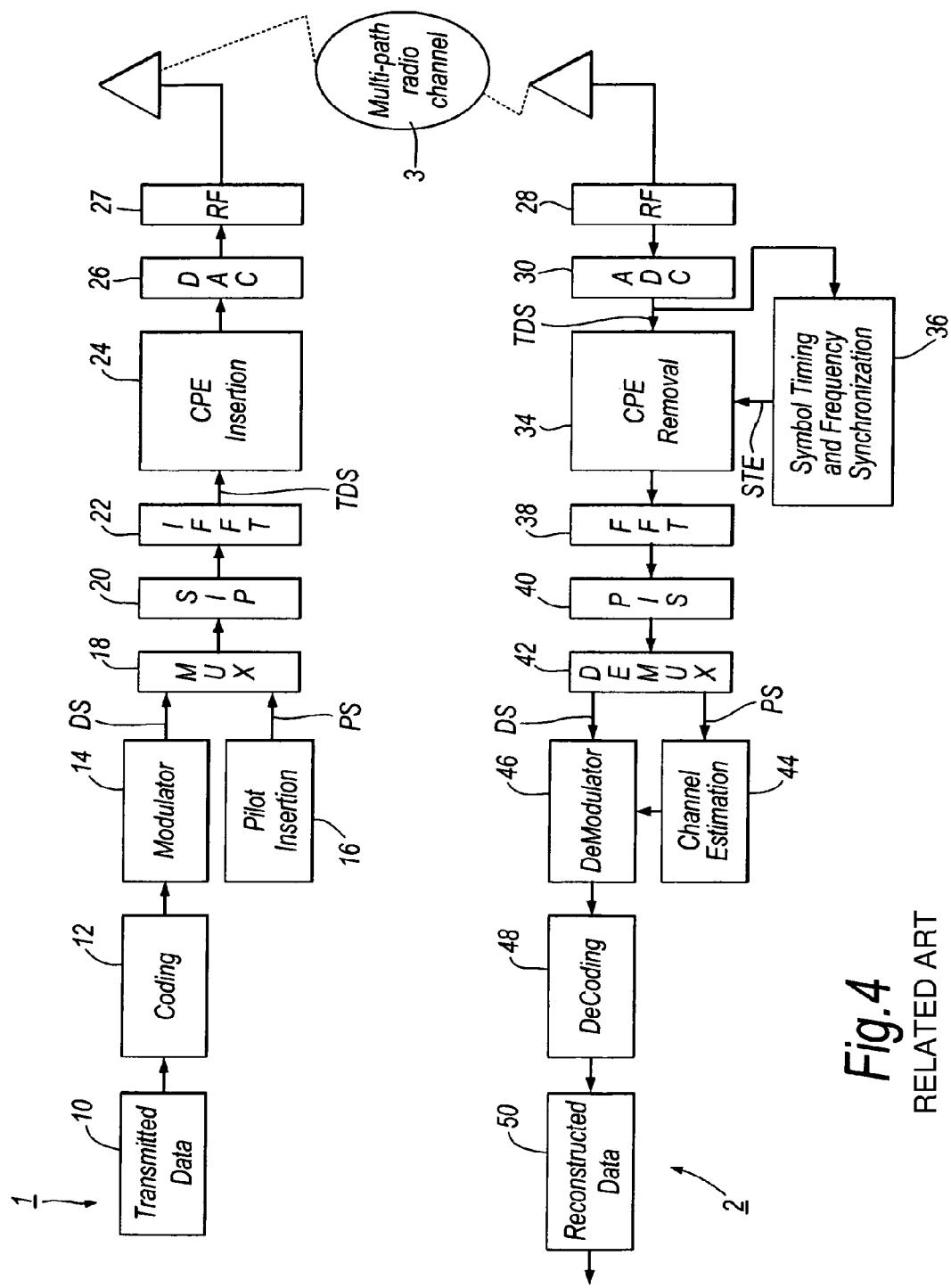
FIG. 4, discussed hereinbefore, is a block diagram of one example of an OFDM system.
Figure 5:
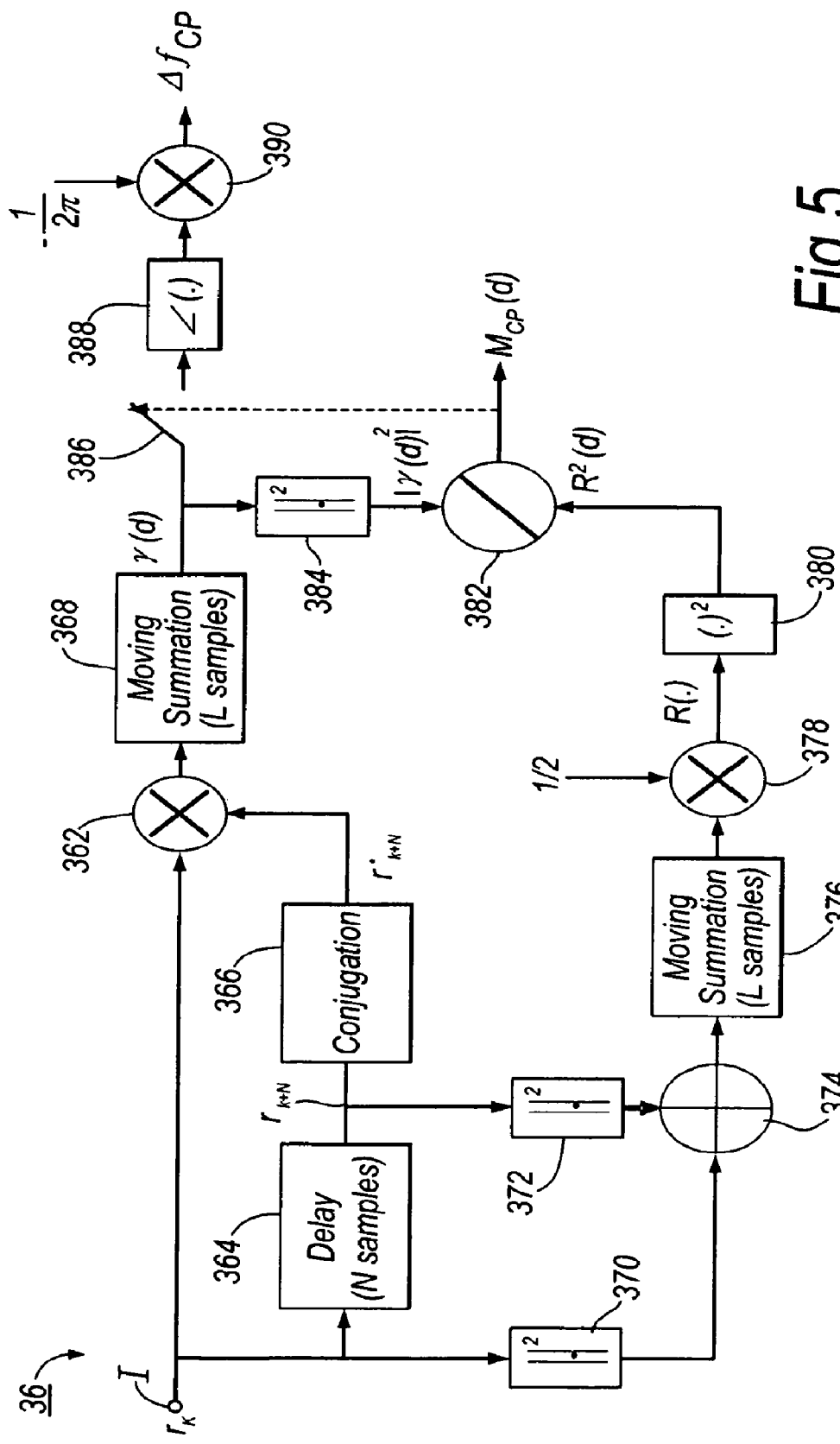
FIG. 5, discussed hereinbefore, is a block diagram showing one conventional implementation of a part of the OFDM system shown in FIG. 4.

Compared to the FIG. 5 apparatus, the FIG. 7 apparatus additionally has a first differentiation block 392 which receives the basic measure $M_{CP}(d)$ representing the normalised correlation function $\gamma(d)$. This first differentiation block 392 carries out a first differentiation operation and produces a first-derivative measure $M_{CP\_diff1}(d)$ based on a first derivative of the basic measure $M_{CP}(d)$. The apparatus also comprises a second differentiation block 394 which receives the first-derivative measure $M_{CP\_diff1}(d)$ and produces a second-derivative measure $M_{CP\_diff2}(d)$ by carrying out a second differentiation operation on the first-derivative measure. Thus, the second-derivative measure produced by the block 394 is based on a second derivative of the basic measure $M_{CP}(d)$.

Because the sample period is short (e.g. 12.75 ns) the differentiation operation in each of the blocks 392 and 394 can be carried out simply by calculating the difference between each sample and the next as this produces a sufficiently accurate estimate of the derivative. However, noise may corrupt the estimation of the derivative, so an averaging filter is preferably applied at the output of each of the blocks 392 and 394 to smooth the signal. By simulation, it has been found that when the guard interval (CPE length) is 200 samples a preferred averaging length at the output of the block 392 (i.e. after the first differentiation) is 40 samples, and a preferred averaging length at the output of the block 394 (i.e. after the second differentiation) is 50 samples. Values in the range from one quarter to one half of the CPE length may be used in practice as the averaging length after the first and second differentiations.

The basic measure, first-derivative measure, and second-derivative measure are supplied to a symbol timing estimator block 396 which analyses the measures to estimate the symbol timing. In this embodiment, the block 396 looks for peaks in the basic measure $M_{CP}(d)$ and in the second-derivative measure $M_{CP\_diff2}(d)$.

The block 396 also applies the following restrictions when analysing the peaks, in order to improve reliability:

(1) the symbol timing estimate should not be later than the peak of the basic measure $M_{CP}(d)$.

(2) the symbol timing estimate should not be earlier by more than the CPE length than the peak of the basic measure $M_{CP}(d)$; and (3) the symbol timing estimate should not be earlier than the peak of the second-derivative measure $M_{CP\_diff2}(d)$.

In this embodiment, if the block 396 finds no peak in the second-derivative measure $M_{CP\_diff2}(d)$, or no peak in that measure which meets restriction (2), then the block 396 takes the peak in the basic measure $M_{CP}(d)$ as the symbol timing estimate. In another embodiment, the symbol timing estimate may also be taken from the peak in the first-derivative measure $M_{CP\_diff1}(d)$, when no or no valid peak in the second-derivative measure $M_{CP\_diff2}(d)$ can be found.

Those skilled in the art will appreciate that a microprocessor or digital signal processor (DSP) may be used in practice to implement some or all of the functions of the symbol timing estimating apparatus in embodiments of the present invention. Such a processor operates according to an operating program to carry out the various functions.

The performance of the FIG. 7 apparatus was assessed by simulation for different channel conditions. Table 1 below presents the link level simulation assumptions used for the simulations.

TABLE 1

| Parameters | Values |
| --- | --- |
| Carrier Frequency | 5 GHz |
| Propagation conditions | AWGN and Rayleigh fading channels. |
| | a) Single Path. |
| | b) 2-Equal Gain Paths and $2^{nd}$ path delay = 1.91 µs (i.e. 150 samples). |
| | c) 12 Paths Exponential model with 1dB gain and 0.20 µs (i.e. 16 samples) delay difference between adjacent paths. |
| Vehicle Speed for Flat Fading | 17 km/h (80 Hz) and 207 km/h (960 Hz) |
| Modulation Schemes | 16 QAM |
| Access | OFDM with single user |
| Bandwidth | 80 MHz |
| FFT size | 1024 |
| Sub-carrier separation | 76.5 KHz |
| Frame Duration | 0.59 us |
| Symbol Duration | 15.62 us ($T_u$: 13.05 us and Gl: 2.55 us) |
| Fast fading model | Jakes spectrum |
| Channel coding | Turbo code with ½ coding |
| Tail bits | 6 and k = 4 |
| No. of iterations for Turbo Coder | 8 |
| Metric for Turbo Coder | Max-Log-MAP |
| Input to Turbo Decoder | Soft |
| Antenna Diversity | Tx/Rx = 1/1 |

In the simulations, low and high fading speeds Fd of 80 Hz and 960 Hz were considered. The low fading speed corresponds to a receiver moving with a speed of 17 km/h and the high fading speed corresponds to a receiver moving with a speed of 207 km/h. The averaging lengths in the blocks 392 and 394 were set to 40 and 50 samples respectively as described above.

Figure 6A:
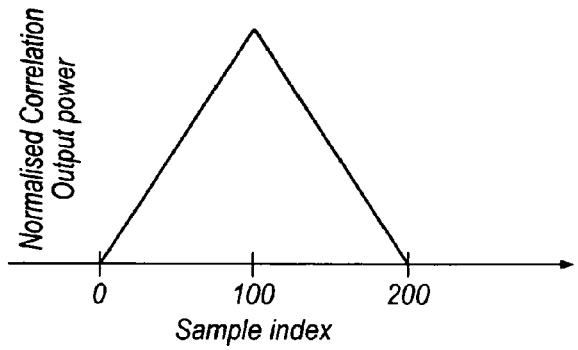
FIGS. 6(A) to 6(D), discussed hereinbefore, are respective graphs showing a variation of a measure used for symbol timing estimation with sample index under various different conditions in the FIG. 5 implementation.
Figure 6B:
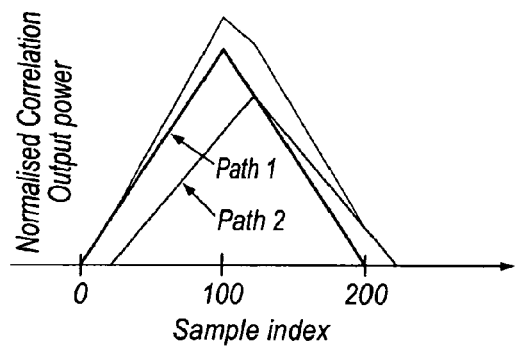
Figure 6C:
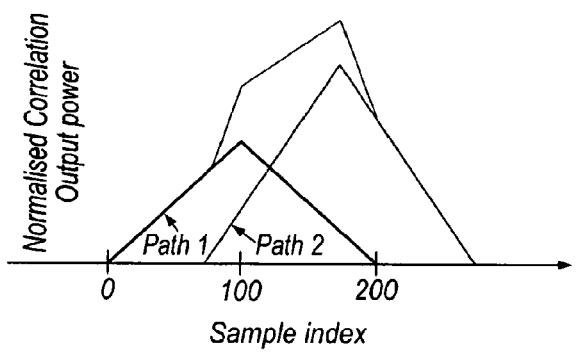
Figure 6D:
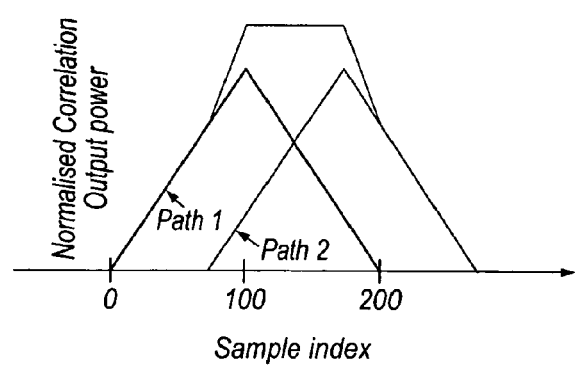
Figure 8A:
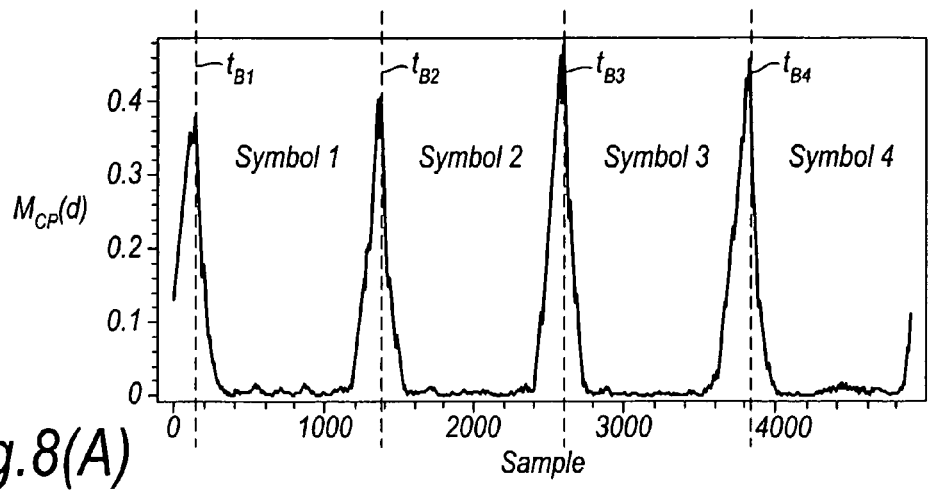
FIGS. 8(A) to 8(C) show example variations of measures used for symbol timing estimation in the FIG. 7 apparatus, the measures being produced by simulation when the multipath conditions are assumed to be two equal paths.
Figure 8B:
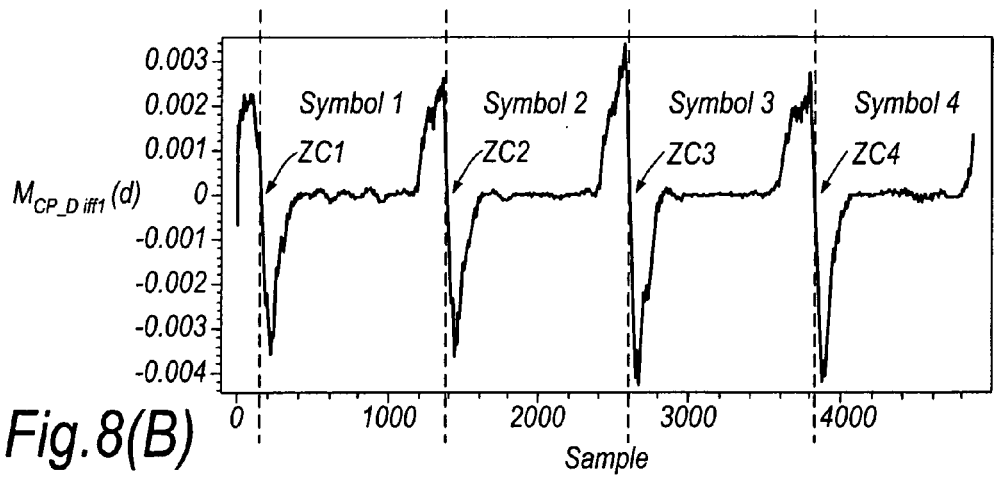
Figure 8C:
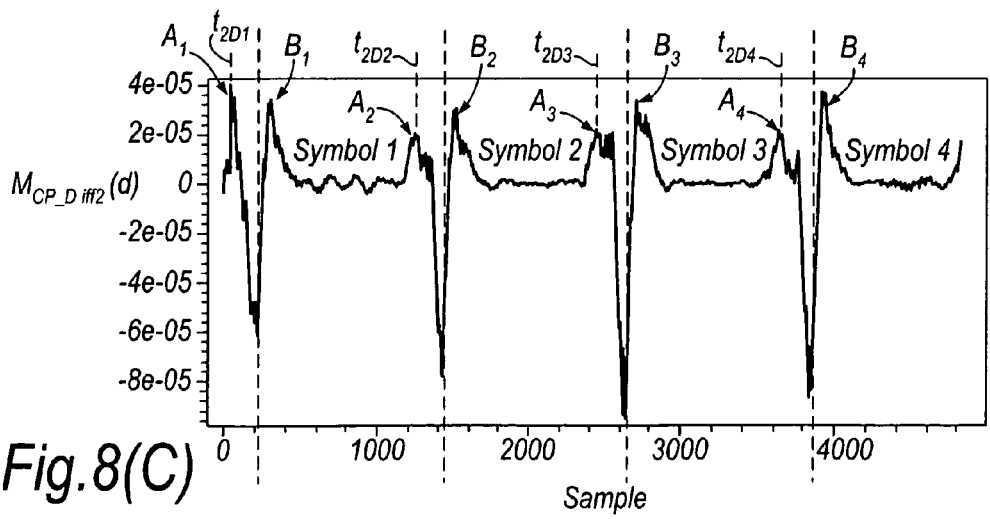

FIG. 8(A) illustrates the variation of the basic measure $M_{CP}(d)$ over four successive symbol periods. FIG. 8(B) shows the variation of the first-derivative measure $M_{CP\_diff1}(d)$ over the same four symbol periods. FIG. 8(C) shows the variation of the second-derivative measure $M_{CP\_diff2}(d)$ over the four symbol periods. In FIGS. 8(A) to 8(C) the multipath condition assumed was two equal paths as in FIG. 6(D) described above.

As shown in FIG. 8(A) the peaks in the basic measure $M_{CP}(d)$ occur at times $t_{B1}$, $t_{B2}$, $t_{B3}$, and $t_{B4}$ in the four symbol periods respectively. In the first-derivative measure $M_{CP\_diff1}(d)$ these peak timings $t_{B1}$ to $t_{B4}$ can be seen as the zero-crossing points in FIG. 8(B). It can be seen from FIG. 8(B) that, before each of these zero-crossing points the first-derivative measure has a maximum peak and that before the maximum peak there is a glitch or side lobe. When the second-derivative measure $M_{CP\_diff2}(d)$, as shown in FIG. 8(C), is considered, two distinct peaks $A_i$ and $B_i$ in each symbol period i can be recognised, the first peak $A_i$ being before the basic-measure peak timing $t_{Bi}$ and the second peak $B_i$ being after the basic-measure peak timing $t_{Bi}$. The symbol timing estimator block 396 ignores the second peak $B_i$ because this is after the peak in the basic measure (restriction (1) above). Accordingly, provided that the first peak $A_i$ is not more than the CPE length (L samples) earlier than $t_{Bi}$ (restriction (2) above), the first peak $A_i$ is assumed to be valid and its timing $t_{2Di}$ is taken as the appropriate symbol timing estimate.

FIGS. 9 to 14 are graphs for comparing the performance of (a) apparatus embodying the present invention with (b) the conventional apparatus described with reference to FIG. 5. These graphs were produced by simulation using the assumptions set out in Table 1.

Figure 9:
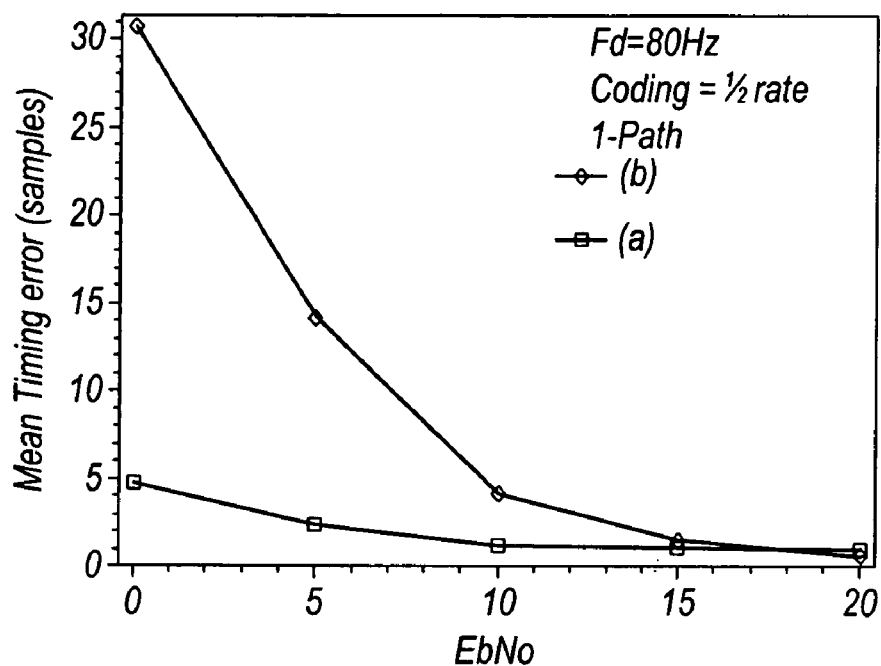
FIGS. 9 to 14 are graphs for use in comparing variation of a mean timing error with signal-to-noise ratio of the received signal under different path conditions for (a) apparatus embodying the present invention and (b) the conventional apparatus of FIG. 5.
Figure 10:
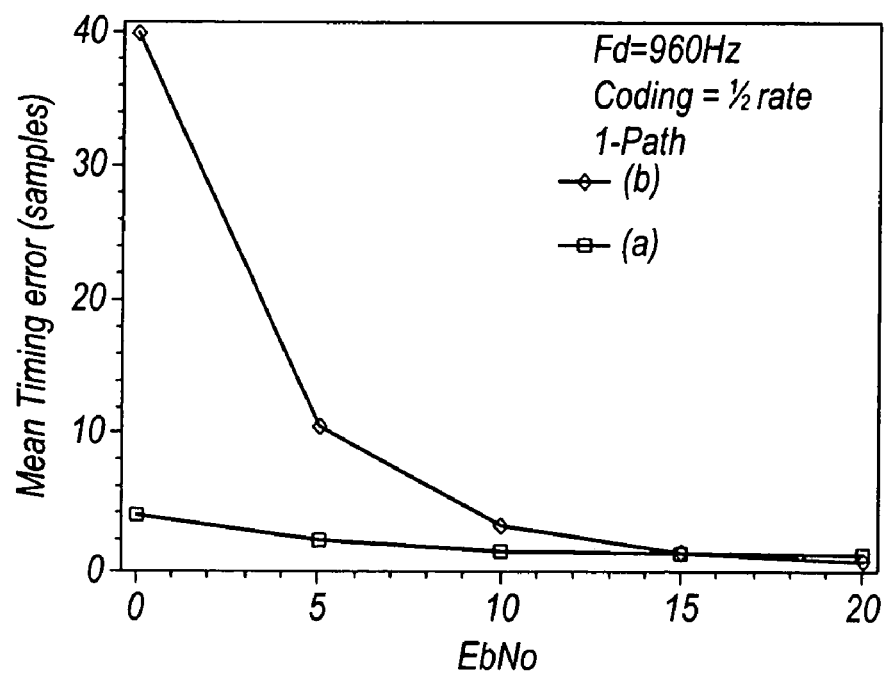
Figure 11:
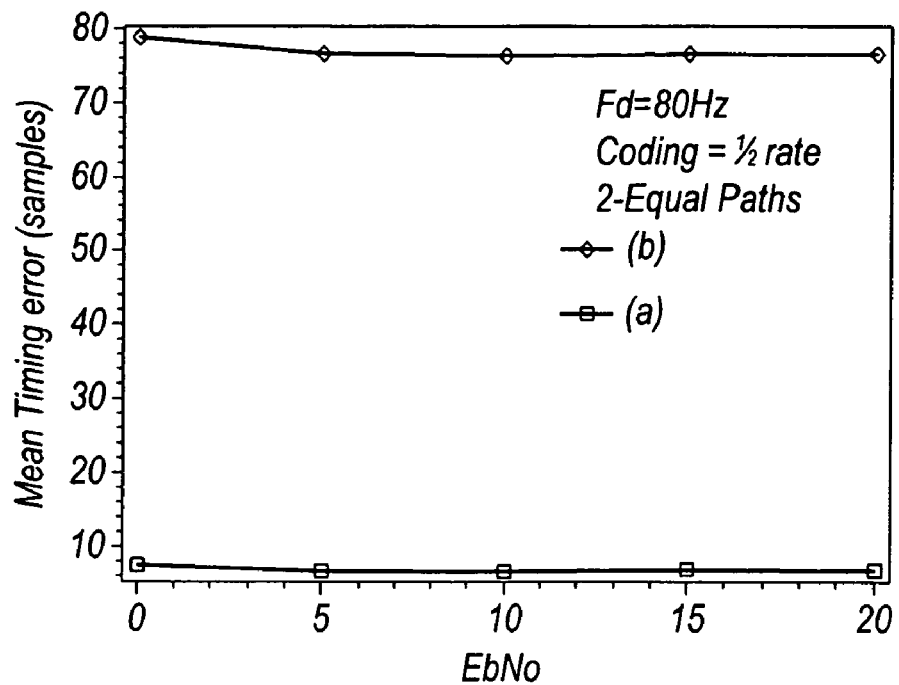
Figure 12:
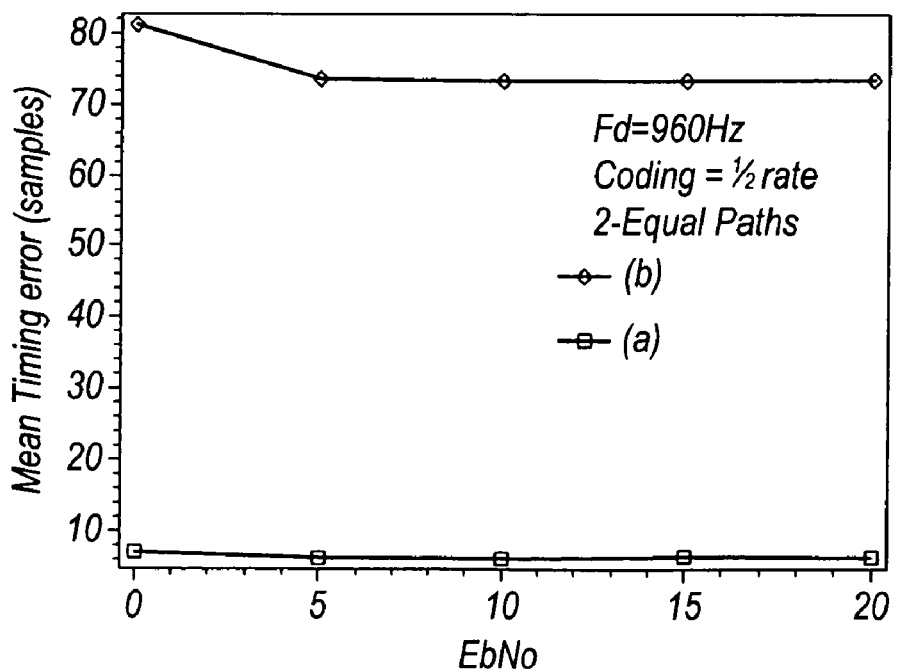
Figure 13:
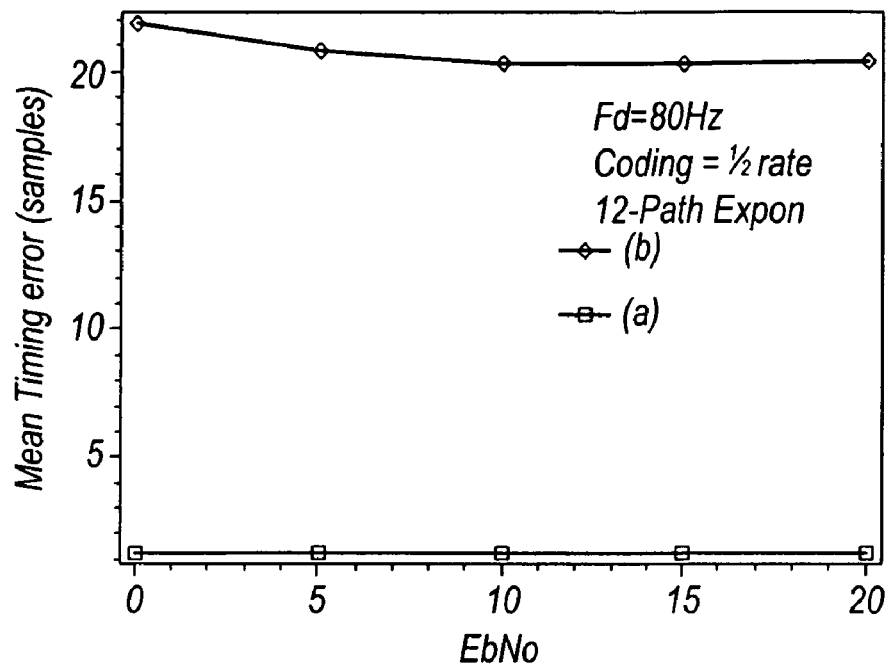
Figure 14:
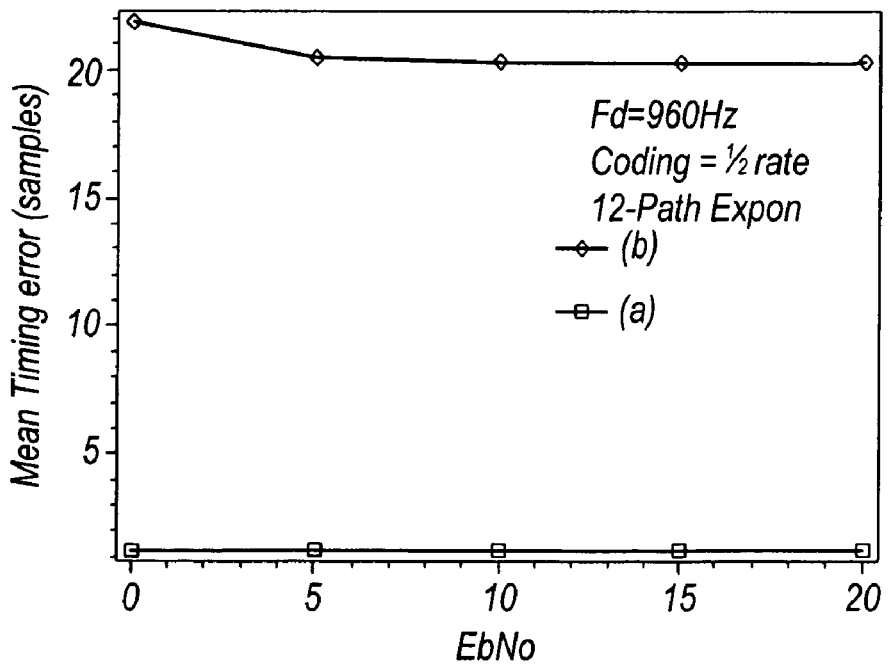

In each graph, the mean timing error (measured in terms of the number of samples) is shown for different signal-to-noise ratio values (different values of the ratio of bit energy to noise power spectral density EbNo expressed in dB). In all the figures the coding used in the transmitter is assumed to be Turbo coding at half rate. In FIGS. 9 and 10 the path conditions are assumed to be a single path. In FIGS. 11 and 12 the path conditions are assumed to be two equal paths. In FIGS. 13 and 14 the path conditions are assumed to be a 12-path exponential model. More details are given in Table 1. FIGS. 9, 11 and 13 relate to slow-moving receivers (Fd=80 Hz) and FIGS. 10, 12 and 14 relate to fast-moving receivers (Fd=960 Hz).

It can be seen that under all the different path conditions and different moving speeds of the receiver considered the apparatus (a) embodying the present invention provides significantly improved performance over the conventional apparatus (b) of FIG. 5.

Figure 15:
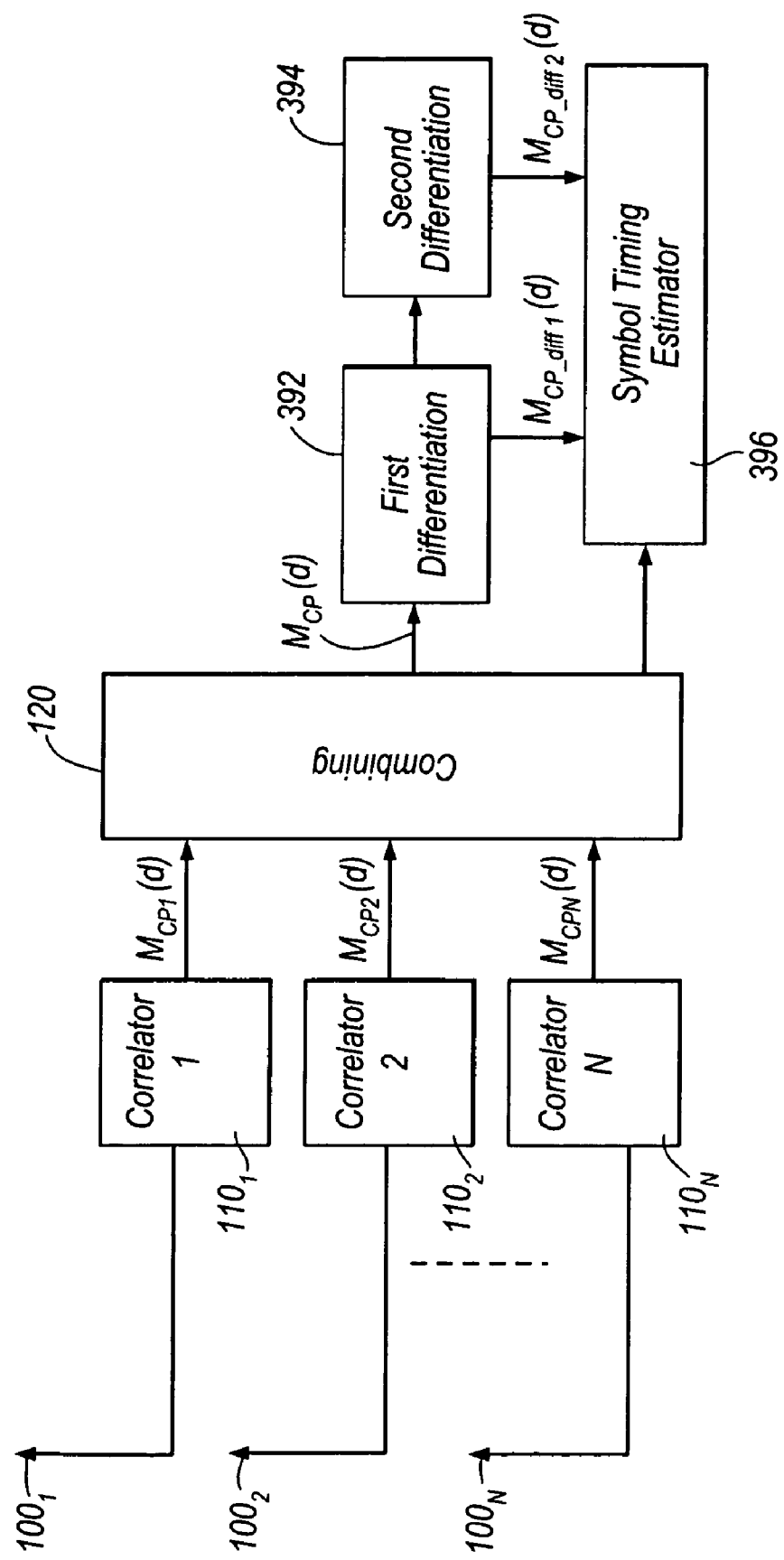
FIG. 15 is a block diagram of symbol timing estimation apparatus according to another preferred embodiment of the present invention.

FIG. 15 is a block diagram of symbol timing estimation apparatus according to another preferred embodiment of the present invention. This embodiment is intended for use when the receiver has a plurality of antennae, for example when receive diversity exists in the receiver. In this case, as shown in FIG. 15, a separate basic measure $M_{CP1}(d)$ to $M_{CPN}(d)$ is produced for each different antenna $100_1$ to $100_N$ by a corresponding correlation block $110_1$ to $110_N$. For example, each correlation block $110_1$ to $110_N$ comprises the blocks 362 to 384 shown in FIG. 7. The respective basic measures $M_{CP1}(d)$ to $M_{CPN}(d)$ for the different antennae are then combined in a combiner 120 to produce a combined basic measure $M_{CP}(d)$. For example, the combiner 120 may simply sum the respective basic measures produced by the correlation blocks $110_1$ to $110_N$. The combined basic measure $M_{CP}(d)$ is then subject to first and second differentiations by blocks 392 and 394 as described previously. In this case, the second-derivative measure $M_{CP\_diff2}(d)$ can provide a single reliable symbol timing estimate for all the antennae.

It is also possible, in a receiver having a plurality of antennae, to treat the basic measures from the different antennae separately, i.e. provide the FIG. 7 circuitry for each antennae.

In the embodiments described above, the transmitted signal was assumed to have a cyclic prefix extension for each symbol. However, the present invention can be applied usefully in any OFDM system in which symbols are successively transmitted in a signal, each symbol comprising a predetermined number of symbol samples, and in which a series of L symbol samples is repeated N symbol samples after its original appearance in the signal. For example, as alternatives to a cyclic prefix, it has also been proposed to apply a cyclic postfix to each symbol. In this case, the cyclic postfix appears at the end of the useful symbol and is a copy of the first L samples of the useful symbol. It is also possible to apply the present invention to a signal which has both a prefix and a postfix. It would also be possible to apply the invention to an OFDM system which does not use any cyclic prefix or postfix. For example, in some OFDM systems the same pilot symbol is transmitted in two successive symbol periods. In this case, even if neither pilot symbol has any cyclic prefix or postfix, the receiver can detect the symbol timing using a correlation function because the same series of symbol samples is repeated a predetermined number of samples (the number of samples in one pilot symbol) after its original appearance.

As described above, embodiments of the present invention can be applied in OFDM systems which use a correlation function to estimate symbol timing, for example WLAN, asymmetrical digital subscriber line (ADSL), multi-carrier code-division multiple access (CDMA), and newly-emerging orthogonal frequency code-spreading division multiplexing (OFCDM) systems. Such embodiments can improve the performance of the OFDM symbol timing synchronisation in multi-path channel conditions.

However, the invention is not limited to use only in OFDM systems and can be applied to other communication systems which do not use OFDM. Indeed, embodiments of the invention are applicable to any communication system which uses a correlation function to estimate symbol timing, for example communication systems according to the Global System for Mobile Communications (GSM) or Universal Mobile Telecommunications System (UMTS). Embodiments of the present invention can provide useful results in any such system where it is desirable to detect reliably the first significant path in a multipath environment.

I claim:

1. A symbol timing estimation method for use in a communication system in which symbols are successively transmitted in a radio signal, each symbol comprising a predetermined number of symbol samples, and in which a series of L symbol samples is repeated N symbol samples after its original appearance, where L and N are integers, which method comprises:
   receiving said radio signal with a receiver and processing in the receiver the symbol samples in the received radio signal using N and L to obtain a correlation function for the originally-appearing series and the repeated series;
   producing in the receiver a basic measure for symbol timing estimation based on the obtained correlation function;
   producing in the receiver a second-derivative measure for symbol timing estimation based on a second derivative of the basic measure; and
   estimating in the receiver the symbol timing based on the basic and second-derivative measures;
   wherein the symbol timing is estimated using a restriction in which the symbol timing estimate is not later than the timing of the peak in said basic measure, a restriction in which the symbol timing estimate is not earlier by more than L samples than the peak of said basic measure, and a restriction in which the symbol timing estimate is not earlier than the peak of said second-derivative measure.

2. The method as claimed in claim 1, wherein said communication system is an orthogonal frequency division multiplexing system.

3. The method as claimed in claim 1, wherein each said symbol comprises N symbol samples, and said originally-appearing series is a cyclic prefix which is inserted at the beginning of each said symbol and is a copy of the last L symbol samples of the symbol concerned.

4. A method as claimed in claim 1, wherein said symbols comprise successive first and second symbols, the same series of L symbol samples appearing in both said first and second symbols with the series in the second symbol appearing N symbol samples after the series in the first symbol, where L<N.

5. A method as claimed in claim 4, wherein said first and second symbols are pilot symbols.

6. A method as claimed in claim 1, further comprising normalising said correlation function based on an energy of the received signal in one or both of the originally-appearing series and the repeated series.

7. A method as claimed in claim 1, wherein the said basic measure is differentiated a first time to produce a first-derivative measure, and the first-derivative measure is differentiated a second time to produce said second-derivative measure.

8. A method as claimed in claim 7, wherein said first-derivative measure is subjected to averaging filtering prior to the second differentiation.

9. A method as claimed in claim 7, wherein said second-derivative measure is subjected to averaging filtering.

10. A method as claimed in claim 1, wherein the symbol timing estimate is set to the timing of a peak value in the second-derivative measure if that peak value occurs in a predetermined window of time ending when the basic measure has a peak value.

11. A method as claimed in claim 1, wherein the symbol timing is estimated using the following restrictions:
   (a) the symbol timing estimate may not be later than the timing of the peak in said basic measure;
   (b) the symbol timing estimate may not be earlier by more than L samples than the peak of said basic measure; and
   (c) the symbol timing estimate may not be earlier than the peak of said second-derivative measure.

12. A method as claimed in claim 1, further comprising setting the symbol timing estimate to the timing of a peak value of said basic measure in the event that no peak or no valid peak is detected in said second-derivative measure.

13. A method as claimed in claim 7, further comprising employing said first-derivative measure as well as said basic measure and said second-derivative measure to estimate the symbol timing.

14. A method as claimed in claim 7, further comprising setting the symbol timing estimate to the timing of a peak value of said first-derivative measure in the event that no peak or no valid peak is detected in said second-derivative measure.

15. A method as claimed in claim 1, comprising:
   receiving said signal via a plurality of antennae and producing such a basic measure for each said antenna; and
   combining the respective basic measures to produce a combined basic measure from which said second-derivative measure is produced.

16. Symbol timing estimation apparatus for use in a communication system in which symbols are successively transmitted in a signal, each symbol comprising a predetermined number of symbol samples, and in which a series of L symbol samples is repeated N symbol samples after its original appearance, where L and N are integers, said apparatus comprising:
- a correlation unit which receives said signal and processes the symbol samples in the received signal using N and L to obtain a correlation function for the originally-appearing series and the repeated series;
- a basic measure producing unit which produces a basic measure for symbol timing estimation based on the obtained correlation function;
- a second-derivative measure producing unit which produces a second-derivative measure for symbol timing estimation based on a second derivative of said basic measure; and
- a symbol timing estimating unit which estimates the symbol timing based on said basic and second-derivative measures;
- wherein the symbol timing is estimated using a restriction in which the symbol timing estimate is not later than the timing of the peak in said basic measure, a restriction in which the symbol timing estimate is not earlier by more than L samples than the peak of said basic measure, and a restriction in which the symbol timing estimate is not earlier than the peak of said second-derivative measure.

17. A receiver, for use in a communication system in which symbols are successively transmitted in a signal, each symbol comprising a predetermined number of symbol samples, and in which a series of L symbol samples is repeated N symbol samples after its original appearance, where L and N are integers, said receiver comprising:
- a correlation unit which receives said signal and processes the symbol samples in the received signal using N and L to obtain a correlation function for the originally-appearing series and the repeated series;
- a basic measure producing unit which produces a basic measure for symbol timing estimation based on the obtained correlation function;
- a second-derivative measure producing unit which produces a second-derivative measure for symbol timing estimation based on a second derivative of said basic measure; and
- a symbol timing estimating unit which estimates the symbol timing based on said basic and second-derivative measures;
- wherein the symbol timing is estimated using a restriction in which the symbol timing estimate is not later than the timing of the peak in said basic measure, a restriction in which the symbol timing estimate is not earlier by more than L samples than the peak of said basic measure, and a restriction in which the symbol timing estimate is not earlier than the peak of said second-derivative measure.

18. The receiver according to claim 17, wherein the receiver corresponds to a user equipment.

19. A recording medium storing an operating program which, when run on a processor in a receiver of a communication system in which symbols are successively transmitted in a signal, each symbol comprising a predetermined number of symbol samples, and in which a series of L symbol samples is repeated N symbol samples after its original appearance, where L and N are integers, causes the processor to:
- receive said signal and process the symbol samples in the received signal using N and L to obtain a correlation function for the originally-appearing series and the repeated series;
- produce a basic measure for symbol timing estimation based on the obtained correlation function;
- produce a second-derivative measure for symbol timing estimation based on a second derivative of the basic measure; and
- estimate the symbol timing based on the basic and second-derivative measures;
- wherein the symbol timing is estimated using a restriction in which the symbol timing estimate is not later than the timing of the peak in said basic measure, a restriction in which the symbol timing estimate is not earlier by more than L samples than the peak of said basic measure, and a restriction in which the symbol timing estimate is not earlier than the peak of said second-derivative measure.

20. Symbol timing estimation apparatus for use in a communication system in which symbols are successively transmitted in a signal, each symbol comprising a predetermined number of symbol samples, and in which a series of L symbol samples is repeated N symbol samples after its original appearance, where L and N are integers, said apparatus comprising:
- correlation means operable to receive said signal and to process the symbol samples in the received signal using N and L to obtain a correlation function for the originally-appearing series and the repeated series;
- basic measure producing means operable to produce a basic measure for symbol timing estimation based on the obtained correlation function;
- second-derivative measure producing means for producing a second-derivative measure for symbol timing estimation based on a second derivative of said basic measure; and
- symbol timing estimating means for estimating the symbol timing based on said basic and second-derivative measures;
- wherein the symbol timing is estimated using a restriction in which the symbol timing estimate is not later than the timing of the peak in said basic measure, a restriction in which the symbol timing estimate is not earlier by more than L samples than the peak of said basic measure, and a restriction in which the symbol timing estimate is not earlier than the peak of said second-derivative measure.

21. Symbol timing estimation apparatus for use in a communication system in which symbols are successively transmitted in a signal, each symbol comprising a predetermined number of symbol samples, and in which a series of L symbol samples is repeated N symbol samples after its original appearance, where L and N are integers, said apparatus comprising:
- a correlation unit which receives said signal and processes the symbol samples in the received signal using N and L to obtain a correlation function for the originally-appearing series and the repeated series;
- a basic measure producing unit which produces a basic measure for symbol timing estimation based on the obtained correlation function;
- a second-derivative measure producing unit which produces a second-derivative measure for symbol timing estimation based on a second derivative of said basic measure; and
- a symbol timing estimating unit which estimates the symbol timing based on said basic and second-derivative measures,
- wherein the symbol timing estimate is set to the timing of a peak value of said basic measure when no valid peak is detected in said second-derivative measure.

* * * * *